US00RE46746E

(19) United States
(12) Reissued Patent
Marchand et al.

(10) Patent Number: US RE46,746 E
(45) Date of Reissued Patent: Mar. 6, 2018

(54) MUD-LUBRICATED BEARING ASSEMBLY WITH MECHANICAL SEAL

(71) Applicant: National Oilwell Varco, L.P., Houston, TX (US)

(72) Inventors: Nicholas Ryan Marchand, Edmonton (CA); Jonathan Ryan Prill, Edmonton (CA)

(73) Assignee: NATIONAL OILWELL VARCO, L.P., Houston, TX (US)

(21) Appl. No.: 15/252,507

(22) Filed: Aug. 31, 2016

Related U.S. Patent Documents

Reissue of:
(64) Patent No.: 8,827,562
Issued: Sep. 9, 2014
Appl. No.: 13/957,757
Filed: Aug. 2, 2013

U.S. Applications:
(60) Provisional application No. 61/679,292, filed on Aug. 3, 2012.

(51) Int. Cl.

| | |
|---|---|
| ***F16C 33/74*** | (2006.01) |
| ***F16C 3/00*** | (2006.01) |
| ***F16C 17/10*** | (2006.01) |
| ***F16C 17/04*** | (2006.01) |
| ***E21B 4/00*** | (2006.01) |

(52) U.S. Cl.
CPC ..... *E21B 4/003* (2013.01)

(58) Field of Classification Search
CPC ..... E21B 4/003; E21B 4/02
USPC ..... 384/130, 97, 228, 241, 131, 138, 194; 266/56, 68
See application file for complete search history.

(56) References Cited

U.S. PATENT DOCUMENTS

| | | | | | |
|---|---|---|---|---|---|
| 3,941,190 | A | * | 3/1976 | Conover | 166/187 |
| 3,982,859 | A | * | 9/1976 | Tschirky et al. | 418/48 |
| 4,106,779 | A | * | 8/1978 | Zabcik | 277/322 |
| 4,198,104 | A | * | 4/1980 | Crase | 384/226 |
| 4,546,836 | A | * | 10/1985 | Dennis et al. | 175/107 |
| 4,632,193 | A | * | 12/1986 | Geczy | E21B 4/00 166/237 |
| 5,248,204 | A | * | 9/1993 | Livingston et al. | 384/97 |
| 5,385,407 | A | * | 1/1995 | De Lucia | 384/97 |
| 5,690,434 | A | * | 11/1997 | Beshoory et al. | 384/613 |

(Continued)

OTHER PUBLICATIONS

Notice of Allowance dated May 29, 2014, for U.S. Appl. No. 13/957,757 (10 p.).

*Primary Examiner* — William Doerrler
(74) *Attorney, Agent, or Firm* — Conley Rose, P.C.

(57) ABSTRACT

In a mud-lubricated bearing assembly for a downhole motor, a mechanical seal is provided between the mandrel and the lower end of the bearing housing to prevent discharge of drilling fluid (mud) from the bearing assembly into the wellbore annulus. The mechanical seal is effected by mating wear-resistant annular contact surfaces provided on the mandrel and the bearing housing, with biasing means preferably being provided to keep the contact surfaces in sealing engagement during both on-bottom and off-bottom operational modes. The diverted drilling fluid passing through the bearings is redirected into the bore of the mandrel via ports through the mandrel wall to rejoin the main flow to the drill bit, such that substantially all of the drilling fluid flows through the bit.

23 Claims, 3 Drawing Sheets

(56) References Cited

U.S. PATENT DOCUMENTS

| | | | | |
|---|---|---|---|---|
| 6,250,806 | B1 * | 6/2001 | Beshoory | 384/97 |
| 6,416,225 | B1 * | 7/2002 | Cioceanu et al. | 384/97 |
| 6,508,317 | B2 * | 1/2003 | Eddison | E21B 4/02 175/107 |
| 8,109,721 | B2 * | 2/2012 | Winnacker | E21B 4/003 415/111 |
| 2007/0071373 | A1 * | 3/2007 | Wenzel | 384/97 |
| 2010/0326730 | A1 * | 12/2010 | Prill et al. | 175/57 |
| 2012/0195542 | A1 * | 8/2012 | Marchand | 384/606 |
| 2012/0275736 | A1 * | 11/2012 | Foote et al. | 384/462 |
| 2013/0004105 | A1 * | 1/2013 | Wenzel | 384/321 |

* cited by examiner

MUD-LUBRICATED BEARING ASSEMBLY WITH MECHANICAL SEAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims benefit of U.S. provisional patent application Ser. No. 61/679,292 filed Aug. 3, 2012, and entitled "Mud-Lubricated Bearing Assembly," which is hereby incorporated herein by reference in its entirety.

STATEMENT REGARDING FEDERALLY SPONSORED RESEARCH OR DEVELOPMENT

Not applicable.

FIELD OF THE DISCLOSURE

The present disclosure relates in general to bearing assemblies for downhole motors used in drilling oil, gas, and water wells, and in particular to mud-lubricated bearing sections in downhole motors.

BACKGROUND

In drilling a wellbore into the earth, such as for the recovery of hydrocarbons or minerals from a subsurface formation, it is conventional practice to connect a drill bit onto the lower end of a drill string (comprising drill pipe sections connected end-to-end) and then to rotate the drill string (by means of either a "rotary table" or a "top drive" associated with a drilling rig) so that the drill bit progresses downward into the earth to create the desired wellbore.

During the drilling process, a drilling fluid (commonly referred to as "drilling mud," or simply "mud") is pumped under pressure downward through the drill string, out the drill bit into the wellbore, and then upward back to the surface through the wellbore annulus between the drill string and the wellbore. The drilling fluid, which may be water-based or oil-based, is typically viscous to enhance its ability to carry wellbore cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the wellbore wall (to stabilize and seal the wellbore wall). To optimize these functions, it is desirable for as much of the drilling fluid as possible to reach the drill bit.

Particularly since the mid-1980s, it has become increasingly common and desirable in the oil and gas industry to use "directional drilling" techniques to drill horizontal and other non-vertical wellbores, to facilitate more efficient access to, and production from, larger regions of hydrocarbon-bearing formations than would be possible using only vertical wellbores. In directional drilling, specialized drill string components and "bottomhole assemblies" (BHAs) are used to induce, monitor, and control deviations in the path of the drill bit, so as to produce a wellbore of desired non-vertical configuration.

Directional drilling is typically carried out using a "downhole motor" (also referred to as a "mud motor") incorporated into the drill string immediately above the drill bit. A typical mud motor includes the following primary components (in order, starting from the top of the motor assembly):

- a top sub adapted to facilitate connection to the lower end of a drill string ("sub" being the common general term in the oil and gas industry for any small or secondary drill string component);
- a power section (commonly comprising a positive displacement motor of well-known type, with a helically-vaned rotor eccentrically rotatable within a stator section, and with a fixed or adjustable straight or bent housing for inducing a wellbore deviation);
- a drive shaft enclosed within a drive shaft housing having a central bore for conveying drilling fluid to the drill bit, with the upper end of the drive shaft being operably connected to the rotor of the power section; and
- a bearing section comprising a cylindrical mandrel coaxially and rotatably disposed within a cylindrical bearing housing, with an upper end coupled to the lower end of the drive shaft, and a lower end connectable to a drill bit.

In drilling processes using a mud motor, drilling fluid is circulated under pressure through the drill string and back up to the surface as in conventional drilling methods. However, the pressurized drilling fluid is diverted through the power section of the mud motor to generate power to rotate the drill bit.

The bearing section must permit relative rotation between the mandrel and the housing, while also transferring axial thrust loads between the mandrel and the housing. Axial thrust loads arise in two drilling operational modes: "on-bottom" loading, and "off-bottom" loading. On-bottom loading corresponds to the operational mode during which the drill bit is boring into a subsurface formation under vertical load from the weight of the drill string, which in turn is in compression; in other words, the drill bit is on the bottom of the borehole. Off-bottom loading corresponds to operational modes during which the drill bit is raised off the bottom of the borehole and the drill string is in tension (i.e., when the bit is off the bottom of the borehole and is hanging from the drill string, such as when the drill string is being "tripped" out of the wellbore, or when the wellbore is being reamed in the uphole direction). Tension loads across the bearing section housing and mandrel are also induced when drilling fluid is being circulated while the drill bit is off bottom, due to the pressure drop across the drill bit and bearing assembly Accordingly, the bearing section of a mud motor must be capable of withstanding thrust loads in both axial directions, with the mandrel rotating inside the bearing housing. Suitable radial bearings are used to maintain coaxial alignment between the mandrel and the bearing housing.

Thrust bearings contained within the bearing section of a mud motor may be either oil-lubricated or mud-lubricated. In an oil-lubricated bearing assembly, the thrust bearings are disposed within a sealed, oil-filled reservoir to provide a clean operating environment. The oil reservoir is located within an annular region between the mandrel and the bearing housing, with the reservoir being defined by the inner surface of the housing and the outer surface of the mandrel, and by sealing elements at the upper and lower ends of the reservoir.

Mud-lubricated bearing assemblies comprise bearings (thrust bearings and/or radial bearings) that are designed for operation in drilling fluid. In conventional mud-lubricated bearings, a portion of the drilling fluid flowing to the drill bit is diverted through the bearings to provide lubrication and cooling, and then is discharged into the wellbore annulus, thus bypassing the bit. This reduces the volume of drilling fluid flowing through the bit, thus reducing the hydraulic energy available for hole cleaning and bit performance.

BRIEF SUMMARY

The present disclosure teaches a mud-lubricated bearing assembly providing a mechanical seal between the mandrel and the lower end of the bearing housing to prevent discharge of drilling fluid from the bearing assembly into the wellbore annulus. The mechanical seal is effected by mating wear-resistant annular contact surfaces provided on the mandrel and the bearing housing, with biasing means preferably being provided to keep the contact surfaces in substantially sealing engagement during both on-bottom and off-bottom operational modes. The diverted drilling fluid passing through the bearings is redirected into the bore of the mandrel (via ports through the mandrel wall) so as to rejoin the main flow through the bit, such that substantially all of the drilling fluid flows through the bit. Preferred embodiments use a combination of hard-faced radial and thrust bearings in a configuration that results in the bearing assembly being substantially shorter than conventional bearing assemblies.

BRIEF DESCRIPTION OF THE DRAWINGS

Embodiments in accordance with the present disclosure will now be described with reference to the accompanying figures, in which numerical references denote like parts, and in which.

DETAILED DESCRIPTION

Figure 1:
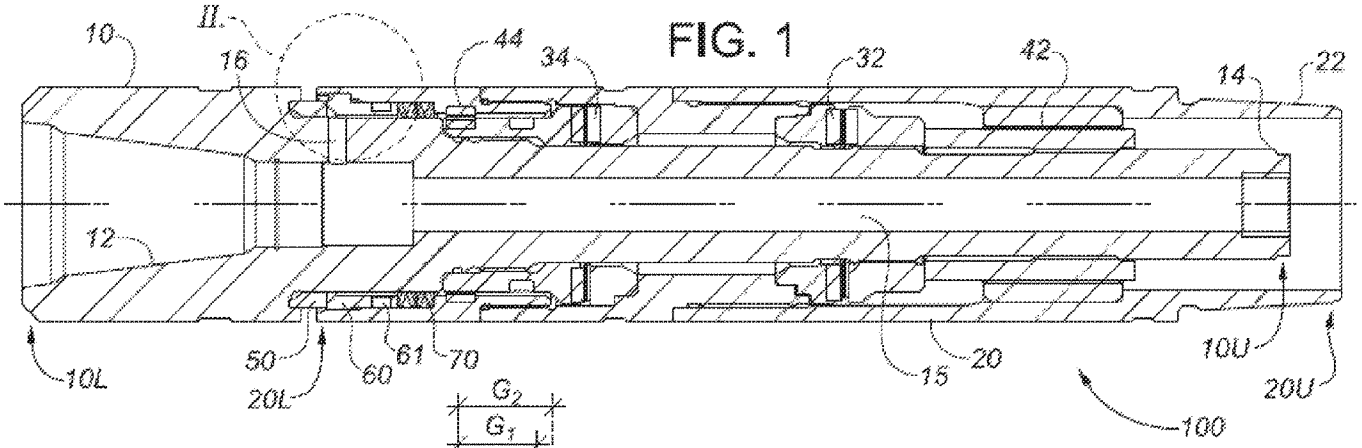
FIG. 1 is a longitudinal section through a first embodiment of a bearing assembly in accordance with the present disclosure.

The following description is exemplary of embodiments of the disclosure. These embodiments are not to be interpreted or otherwise used as limiting the scope of the disclosure, including the claims. It will be readily appreciated by those skilled in the art that various modifications to embodiments in accordance with the present disclosure may be devised without departing from the scope of the present teachings, including modifications which may use equivalent structures or materials hereafter conceived or developed. One skilled in the art will understand that the following description has broad application, and the discussion of any embodiment is meant only to be exemplary of that embodiment, and is not intended to suggest in any way that the scope of the disclosure, including the claims, is limited to that embodiment. It is to be especially understood that the scope of the claims appended hereto should not be limited by any particular embodiments described and illustrated herein, but should be given the broadest interpretation consistent with the description as a whole. It is also to be understood that the substitution of a variant of a claimed or illustrated element or feature, without any substantial resultant change in functionality, will not constitute a departure from the scope of the claims.

The drawing figures are not necessarily to scale. Certain features and components disclosed herein may be shown exaggerated in scale or in somewhat schematic form, and some details of conventional elements may not be shown in the interest of clarity and conciseness. In some of the figures, one or more components or aspects of a component may be not displayed or may not have reference numerals identifying the features or components that are identified elsewhere in order to improve clarity and conciseness of the figure.

The terms "including" and "comprising" are used herein, including in the claims, in an open-ended fashion, and thus should be interpreted to mean "including, but not limited to . . . ." A reference to an element by the indefinite article "a" does not preclude the presence or inclusion of more than one such element, unless the context clearly requires that there be one and only one such element. Also, any form of the terms "couple," "connect," "engage," "attach," "secure," or any other term describing an interaction between elements is intended to mean either an indirect or direct connection. Thus, if a first component couples or is coupled to a second component, the connection between the components may be through a direct engagement of the two components, or through an indirect connection that is accomplished via other intermediate components, devices and/or connections. In addition, if the connection transfers electrical power or signals, whether analog or digital, the coupling may comprise wires or a mode of wireless electromagnetic transmission, for example, radio frequency, microwave, optical, or another mode. So too, the coupling may comprise a magnetic coupling or any other mode of transfer known in the art, or the coupling may comprise a combination of any of these modes.

In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis. Any reference to up or down in the description and the claims will be made for purpose of clarification, with "up", "upper", "upwardly", or "upstream" meaning toward the surface of the well and with "down", "lower", "downwardly", or "downstream" meaning toward the terminal end of the well, regardless of the well bore orientation. In some applications of the technology, the orientations of the components with respect to the surroundings may be different. For example, components described as facing "up", in another application, may face to the left, may face down, or may face in another direction. Still further, as used herein the terms "sealed" and "gas-tight" may be used to describe components, devices, and equipment that allow fluids to flow therethrough but prevent gases from escaping into the surrounding environment during normal operating conditions.

As used herein, relational terms such as but not limited to "coaxial" and "perpendicular" are not intended to denote or require absolute mathematical or geometrical precision.

Accordingly, such terms are to be understood as denoting or requiring substantial precision only (e.g., "substantially coaxial") unless the context clearly requires otherwise. Wherever used in this document, the terms "typical" and "typically" are to be interpreted in the sense of representative of common usage or practice, and are not to be understood as implying essentiality or invariability.

FIG. 1 illustrates one embodiment of a mud motor bearing assembly 100 in accordance with the present disclosure. Bearing assembly 100 comprises a generally cylindrical mandrel 10 which is rotatable within a generally cylindrical housing 20. The lower end 10L of mandrel 10 has a threaded connection 12 for connection to the drill bit or other BHA components below the motor, and the upper end 10U of mandrel 10 comprises a threaded connection 14 for connection to the driveshaft assembly and rotor of the power section (not shown). Mandrel 10 has a longitudinal channel or bore 15 for conveying drilling fluid to the drill bit. The upper end 20U of housing 20 comprises a threaded connection 22 for connection to the fixed or adjustable straight or bent housing and stator of the power section.

Bearing assembly 100 comprises multiple bearings for transferring the various axial and radial loads between mandrel 10 and housing 20 that occur during the drilling process. An upper thrust bearing 32 and a lower thrust bearing 34 transfer off-bottom and on-bottom operating loads, respectively, while an upper radial bearing 42 and a lower radial bearing 44 transfer radial loads between mandrel 10 and housing 20.

Figure 2:
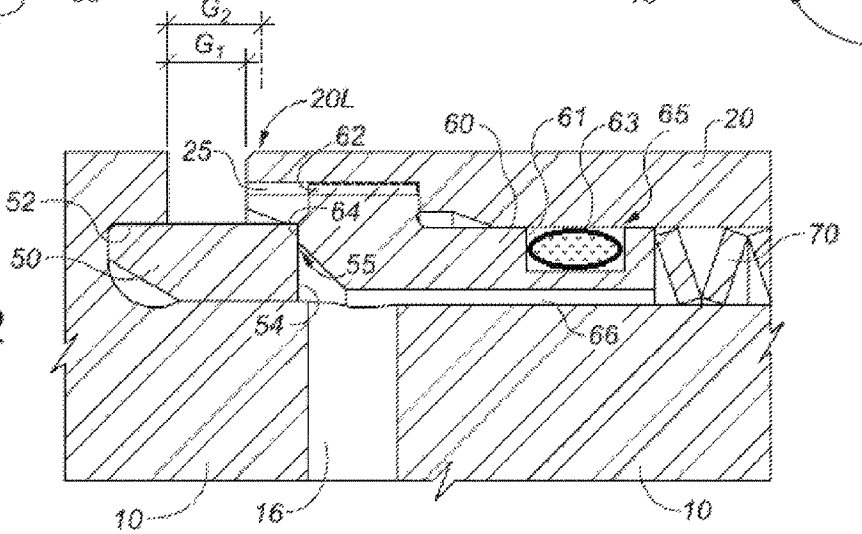
FIG. 2 is an enlarged sectional detail of the upper and lower seal rings of the bearing assembly in FIG. 1.

As shown in enlarged detail in FIG. 2, bearing assembly 100 further comprises an annular lower seal ring 50 axially and non-rotatably secured to mandrel 10 in a region adjacent to lower end 20L of housing 20, plus a "floating" annular upper seal ring 60 mounted to a lower region of housing 20 such that upper seal ring 60 is non-rotatable relative to housing 20 but is axially movable relative to housing 20 within a defined range of travel.

For optimal operational effectiveness, bearing assembly 100 preferably includes seal assembly 65 for sealing between upper seal ring 60 and the adjacent inner cylindrical surface of housing 20. In this embodiment, the seal assembly 65 includes an annular seal groove 61 in the outer surface of upper seal ring 60 as shown in FIG. 2, and an annular sealing member 63 disposed therein. In general, the sealing member 63 can be of any suitable type, such as (by way of non-limiting example) an elastomeric O-ring disposed within the annular seal groove 61.

Lower seal ring 50 has a wear-resistant annular upper seal surface 54 in a plane perpendicularly transverse to the longitudinal axis of the mandrel, and upper seal ring 60 has a wear-resistant annular lower seal surface 64 matingly engageable with upper seal surface 54 on lower seal ring 50 so as to prevent leakage of drilling fluid across the interface 55 between seal surfaces 54 and 64 except in miniscule amounts if any. Persons skilled in the art will be aware of various materials that can be used for fabrication or hard-facing of seal rings 50 and 60 to provide seal surfaces 54 and 64 with wear resistance to suit specific requirements, and embodiments in accordance with the present disclosure are not limited or restricted to the use of any particular means or materials for providing wear resistance on seal surfaces 54 and 64.

Mandrel 10 is provided with one or more fluid ports 16 extending between bore 15 of mandrel 10 and the outer surface of mandrel 10 adjacent to upper seal ring 60. Because flow across seal interface 55 is substantially prevented, drilling fluid diverted through the bearings will be directed through fluid ports 16 into mandrel bore 15 to join the main flow of fluid to the drill bit. For this purpose, fluid must be able to flow downward through or past upper seal ring 60 in order to reach fluid ports 16. In the illustrated embodiment, and as best seen in FIG. 2, this can be facilitated by sizing upper seal ring 60 to provide an annular space 66 between the inner surface of upper seal ring 60 and the outer surface of mandrel 10. However, bearing assemblies in accordance with the present disclosure are not limited to this particular arrangement, and persons skilled in the art will understand that fluid flow to ports 16 can be effected or facilitated in a variety of other ways. By way of non-limiting alternative example, upper seal ring 60 could be made to fit fairly closely around mandrel 10 while including one or more longitudinal grooves or channels allowing flow through seal ring 60.

Lower seal ring 50 may be non-rotatably secured to mandrel 10 by any suitable means, such as (to provide one non-limiting example) by way of an interference fit at a cylindrical interface 52 with mandrel 10 as shown in FIG. 2.

Similarly, bearing assemblies in accordance with the present disclosure are not limited or restricted to any particular means for non-rotatably securing floating upper seal ring 60 to housing 20 or for permitting longitudinal movement of upper seal ring 60 relative to housing 20. However, FIG. 2 illustrates one non-limiting example of means for providing these features. In the illustrated embodiment, upper seal ring 60 is formed with one or more axially-oriented splines 62 slidable within mating grooves 25 formed in housing 20.

During operation of a mud motor incorporating bearing assembly 100, mandrel 10 will rotate relative to housing 20, so lower seal ring 50 will rotate relative to floating upper seal ring 60. In the typical case, there will be limited axial travel between mandrel 10 and housing 20 as the configuration of bearing assembly 100 changes from on-bottom to off-bottom loading conditions or vice versa. FIG. 2 illustrates the operational case in which bearing assembly 100 is under on-bottom loading, with a gap $G_1$ being formed between lower end 20L of housing 20 and the adjacent portion of mandrel 10. When bearing assembly 100 is under off-bottom loading, a slightly larger gap $G_2$ will be formed between lower end 20L of housing 20 and mandrel 10 as splines 62 on upper seal ring 60 slide downward within grooves 25 in housing 20.

Preferably, upper and lower seal surfaces 54 and 64 will at all times remain matingly engaged to prevent fluid leakage across interface 55, by virtue of biasing means provided for biasing floating upper seal ring 60 toward fixed lower seal ring 50. Such biasing means may be provided in the form of springs 70 as shown in the Figures. Springs 70 are illustrated in the Figures in the form of a "stack" of Belleville washers. However, this is by way of non-limiting example only, and any suitable alternative biasing means (such as one or more helical springs) may be used without departing from the scope of the disclosure. In addition, differential pressure across the seal assembly 65, and in particular seal member 63, will also bias upper seal ring 60 toward lower seal ring 50.

Figure 3:
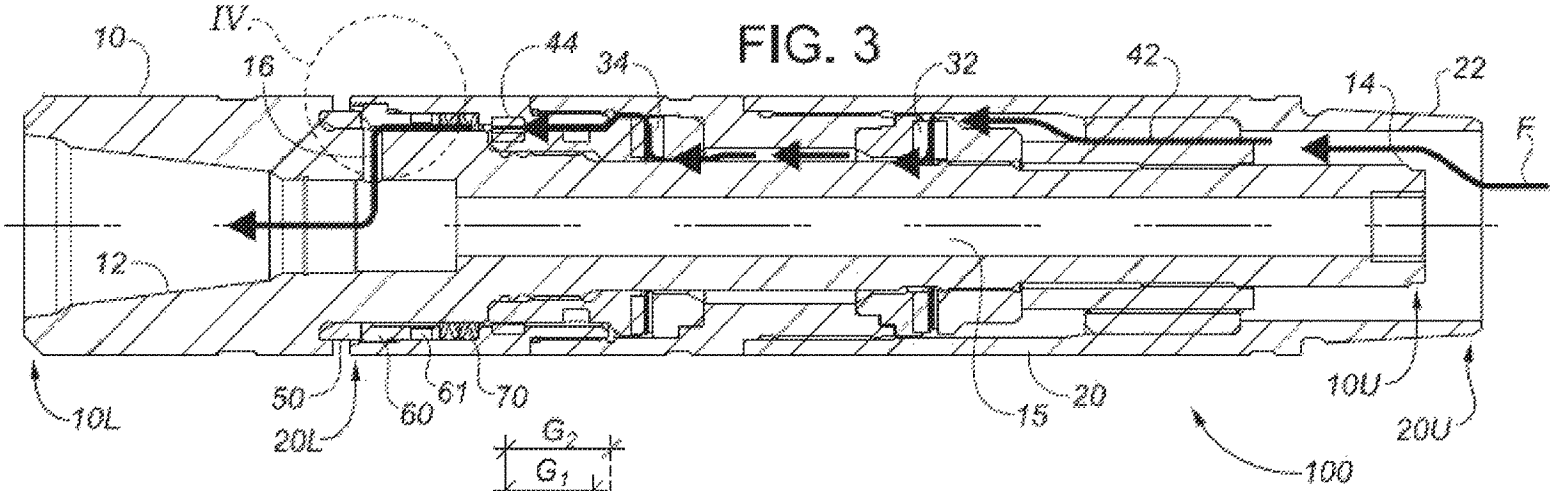
FIG. 3 is a longitudinal section as in FIG. 1, illustrating the fluid flow path through the bearing assembly.
Figure 4:
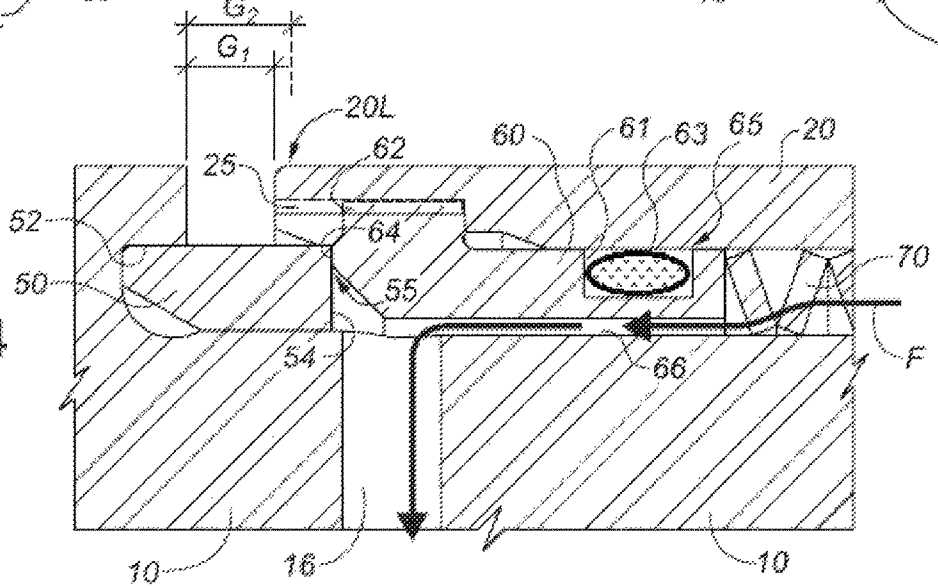
FIG. 4 is an enlarged sectional detail as in FIG. 2, illustrating the fluid flow path from the annulus between the mandrel and the bearing housing into the mandrel bore.

During operation of the mud motor, a portion of the circulating drilling fluid is diverted through the bearings to lubricate and cool bearings 32, 34, 42, and 44 (in the illustrated embodiment). This diverted fluid continues to flow past the bearings until reaching interface 55 between seal faces 54 and 64 of seal rings 50 and 60, respectively. Preferably, seal faces 54 and 64 will be highly polished to minimize leakage of drilling fluid across interface 55 between seal rings 50 and 60, such that all or substantially all of the fluid exiting the bearings is redirected through ports 16 in mandrel 10 to join the main flow of fluid in mandrel bore 15 and to proceed onward toward the bit. This fluid flow path is illustrated by flow arrows F in FIGS. 3 and 4.

Figure 5:
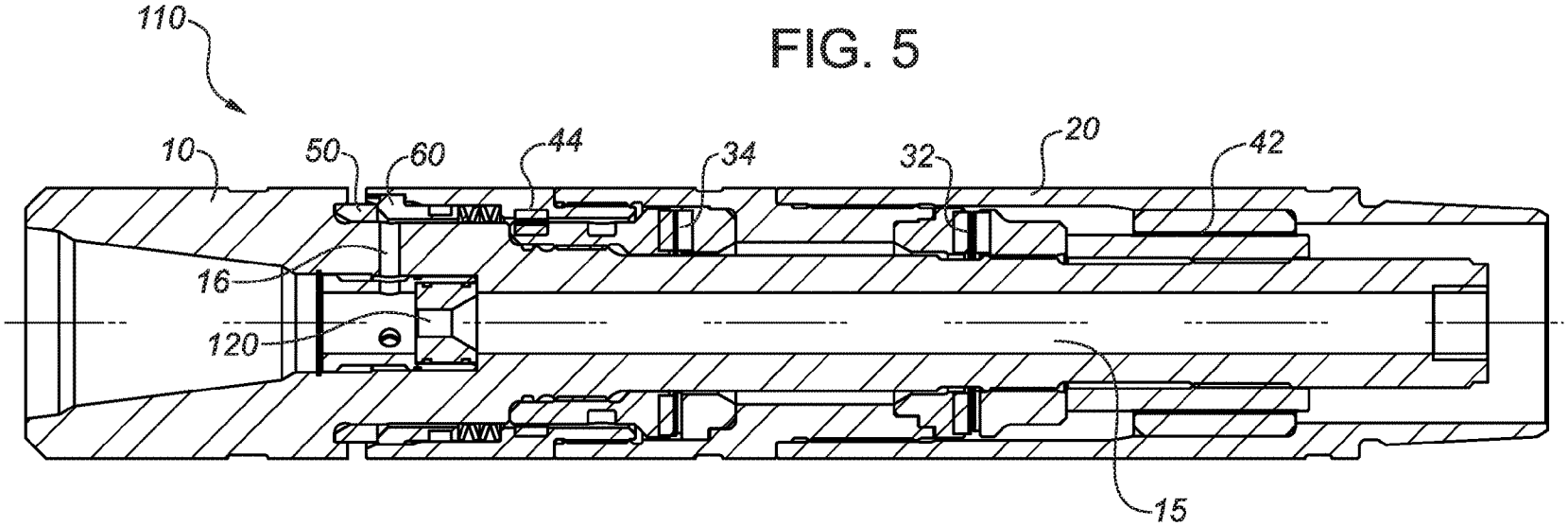
FIG. 5 is a longitudinal section through a second embodiment of a bearing assembly in accordance with the present disclosure, incorporating a flow-restricting nozzle disposed in a lower region of the mandrel bore.

FIG. 5 illustrates a variant bearing assembly 110 generally similar to bearing assembly 100 but in which a nozzle 120 is provided near lower end 10L of mandrel 10 above fluid ports 16, to create a pressure drop across the bearing assembly to force the flow of drilling fluid through the bearings. In embodiments not incorporating nozzle 120, other means may be provided to help ensure adequate fluid flow through the bearings. To provide one non-limiting example of such means, in embodiments in which upper radial bearing 42 is provided in the form of a bushing-type bearing, upper radial bearing 42 could be provided with longitudinally-oriented grooves or channels to facilitate adequate fluid flow. Another alternative would be to provide radial ports through the wall of mandrel 10 into mandrel bore 15 at a point between upper thrust bearing 32 and upper radial bearing 42.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A mud-lubricated bearing assembly comprising:

a generally cylindrical housing;

an elongate mandrel having a longitudinal bore, [said] *wherein the* mandrel [being] *is* coaxially disposed within the housing and [being] *is* rotatable relative to the housing;

a thrust bearing configured to transfer axial on-bottom loads and off-bottom loads from the mandrel to the housing;

a radial bearing disposed within [the] *an* annular space between the mandrel and the housing [and], *where in the radial bearing is* configured to maintain coaxial alignment of the mandrel and the housing;

an annular lower seal ring coaxially and non-rotatably secured to a lower region of the mandrel, [said] *wherein the* lower seal ring [having] *includes* an annular upper seal surface [in a plane perpendicularly transverse to the longitudinal axis of the mandrel]; and an annular upper seal ring mounted to a lower region of the housing [such that], *wherein* the upper seal ring is non-rotatable relative to the housing [and axially movable relative to the housing within a defined range of travel], [said] *and wherein the* upper seal ring [having] *includes* an annular lower seal surface matingly engageable with the upper seal surface of the lower seal ring;

wherein the mandrel includes one or more fluid ports configured to allow fluid flow into the [mandrel] bore *of the mandrel* from [an] *the* annular space between the mandrel and the housing.

2. [A] *The* bearing assembly [as in] *of* claim 1, further comprising biasing means for maintaining said upper and lower seal surfaces in mating engagement.

3. [A] *The* bearing assembly [as in] *of* claim 2, wherein the biasing means comprises a spring.

4. [A] *The* bearing assembly [as in] *of* claim 2, wherein the spring is disposed above the upper seal ring in the annular space between the mandrel and the housing.

5. [A] *The* bearing assembly [as in] *of* claim 1, further comprising a seal assembly for sealing between the upper seal ring and the housing.

6. [A] *The* bearing assembly [as in] *of* claim 5, wherein the seal assembly comprises an O-ring disposed within an annular seal groove in an outer surface of the upper seal ring.

7. [A] *The* bearing assembly [as in] *of* claim 1, wherein non-rotatability of the lower seal ring relative to the mandrel is provided by an interference fit between the lower seal ring and the mandrel.

8. [A] *The* bearing assembly [as in] *of* claim 1, wherein non-rotatable axial movability of the upper seal ring relative to the housing is provided by a plurality of axially-oriented splines on the upper seal ring that slidably engages a plurality of mating grooves on the housing.

9. [A] *The* bearing assembly [as in] *of* claim 1, wherein the upper seal surface on the lower seal ring and the lower seal surface of the upper seal ring are wear-resistant.

10. [A] *The* bearing assembly [as in] *of* claim 9, wherein the upper and lower seal surfaces are provided with wear resistance by hard facing.

11. [A] *The* bearing assembly [as in] *of* claim 1, wherein the upper seal surface on the lower seal ring and the lower seal surface of the upper seal ring are polished.

12. [A] *The* bearing assembly [as in] *of* claim 1, further comprising means for providing a pressure drop across the bearing assembly.

13. [A] *The* bearing assembly [as in] *of* claim 12, wherein the means for providing a pressure drop comprises a flow-restricting nozzle disposed in a lower region of the mandrel bore.

*14. The bearing assembly of claim 1, wherein the upper seal ring is axially movable relative to the housing within a defined range of travel.*

*15. The beating assembly of claim 1, wherein the annular upper seal surface of the lower seal ring is disposed in a plane perpendicularly transverse to the longitudinal axis of the mandrel.*

*16. A mud-lubricated bearing assembly comprising:*

*an outer housing;*

*an elongate mandrel coaxially disposed within the outer housing, wherein the mandrel includes a longitudinal bore and is configured to rotate relative to the outer housing;*

*a thrust bearing disposed in an annular space between the mandrel and the outer housing, wherein the thrust bearing is configured to transfer axial on-bottom loads and off-bottom loads from the mandrel to the housing;*

*a radial bearing disposed within an annular space, where in the radial bearing is configured to maintain coaxial alignment of the mandrel and the outer housing;*

*a first seal ring disposed about the mandrel, wherein the first seal ring is non-rotatably coupled to the mandrel and includes an annular seal surface; and*

*a second seal ring disposed about the mandrel, wherein the second seal ring is non-rotatably coupled to the outer housing and includes an annular seal surface that, matingly engages the annular seal surface of the first seal ring:*

*wherein the mandrel includes a fluid port extending radially from the annular space to the bore of the mandrel.*

*17. The bearing assembly of claim 16, wherein the second seal ring is axially moveable relative to the outer housing.*

*18. The bearing assembly of claim 17, wherein the second seal ring is axially moveable relative to the outer housing within a defined range of travel.*

*19. The bearing assembly of claim 16, wherein the first seal ring is positioned axially below the second seal ring.*

*20. The bearing assembly of claim 16, further comprising biasing means disposed in the annular space, wherein the second seal ring is axially positioned between the biasing means and the first seal ring, and wherein the biasing means is configured to urge the annular seal surface of the second seal ring into engagement with the annular seal surface of the first seal ring.*

*21. The bearing assembly of claim 16, further comprising an annular seal assembly radially positioned between the second seal ring and the housing.*

*22. The bearing assembly of claim 16, wherein the first seal ring is non-rotatably coupled to the mandrel with an interference fit.*

*23. The bearing assembly of claim 16, wherein the second seal ring is coupled to the outer housing with a plurality of axially-oriented splines on the second seal ring that slidably engage a plurality of mating grooves on the outer housing.*

* * * * *